(12) United States Patent
Schwalbe

(10) Patent No.: US 10,176,350 B1
(45) Date of Patent: Jan. 8, 2019

(54) SCANNER HOUSING

(71) Applicant: Amazon Technologies, Inc., Seattle, WA (US)

(72) Inventor: Jorge Juan Schwalbe, Puyallup, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/664,700

(22) Filed: Jul. 31, 2017

(51) Int. Cl.
G06K 7/10 (2006.01)
G06F 13/42 (2006.01)

(52) U.S. Cl.
CPC ..... G06K 7/10415 (2013.01); G06F 13/4286 (2013.01); G06F 2213/0002 (2013.01); G06F 2213/0042 (2013.01)

(58) Field of Classification Search
CPC ............ G06K 7/10415; G06F 13/4286; G06F 2213/0002; G06F 2213/0042
USPC ........................................ 235/380, 451, 486
See application file for complete search history.

(56) References Cited

U.S. PATENT DOCUMENTS

| 6,840,447 | B2* | 1/2005 | Hirata | G06K 7/0008 235/451 |
| 2003/0010828 | A1* | 1/2003 | Hirata | G06K 7/0008 235/486 |
| 2008/0083829 | A1* | 4/2008 | Lowe | A45C 11/18 235/486 |
| 2009/0066516 | A1* | 3/2009 | Lazo | G06K 19/0724 340/572.7 |
| 2011/0285511 | A1* | 11/2011 | Maguire | G06K 19/0724 340/10.1 |
| 2013/0015960 | A1* | 1/2013 | Kaga | G06K 19/07749 340/10.51 |
| 2013/0342319 | A1* | 12/2013 | Rimai | G06K 19/07327 340/10.1 |
| 2016/0042211 | A1* | 2/2016 | Hiraiwa | G06K 7/10356 235/439 |

* cited by examiner

Primary Examiner — Paultep Savusdiphol
(74) Attorney, Agent, or Firm — Kilpatrick Townsend & Stockton LLP

(57) ABSTRACT

Assemblies and related methods for maximizing scanning accuracy of a RFID desktop card reader utilize a housing to which the RFID desktop card reader is mounted to control the position and orientation of an identification device read by the card reader relative to the card reader. An identification assembly for reading an identification device includes a desktop card reader and a housing. The desktop card reader is configured to read an RFID tag included in the identification device and communicate data read from the RFID tag to a computer. The desktop card reader is detachably mounted to the housing. The housing includes a slot into which the identification device is inserted to restrain the identification device spaced apart from the desktop card reader by a gap.

20 Claims, 6 Drawing Sheets

SCANNER HOUSING

BACKGROUND

Radio-frequency identification (RFID) is often used to interrogate an RFID tag attached to an identification card to identify a person to which the identification card is assigned. In many instances, an RFID reader interrogates the RFID tag by emitting radio waves that cause the RFID tag to transmit data stored on the RFID tag to the RFID reader.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An identification assembly configured to read an identification device includes a housing and an RFID card reader for reading an RFID card included in the identification device. The housing is configured so that the RFID card reader is detachably mountable to the housing. In some embodiments, the housing includes a slot into which the identification device is inserted to restrain the identification device in a fixed position and orientation relative to the RFID card reader. In some embodiments, the fixed position and orientation in which the housing restrains the identification device relative to the RFID card reader has been determined to provide the highest level of scanning accuracy. The identification assembly can be particularly beneficial for use with some existing low-cost RFID card readers when the identification device includes an RFID card configured to be read at each of two different frequencies.

Figure 1:
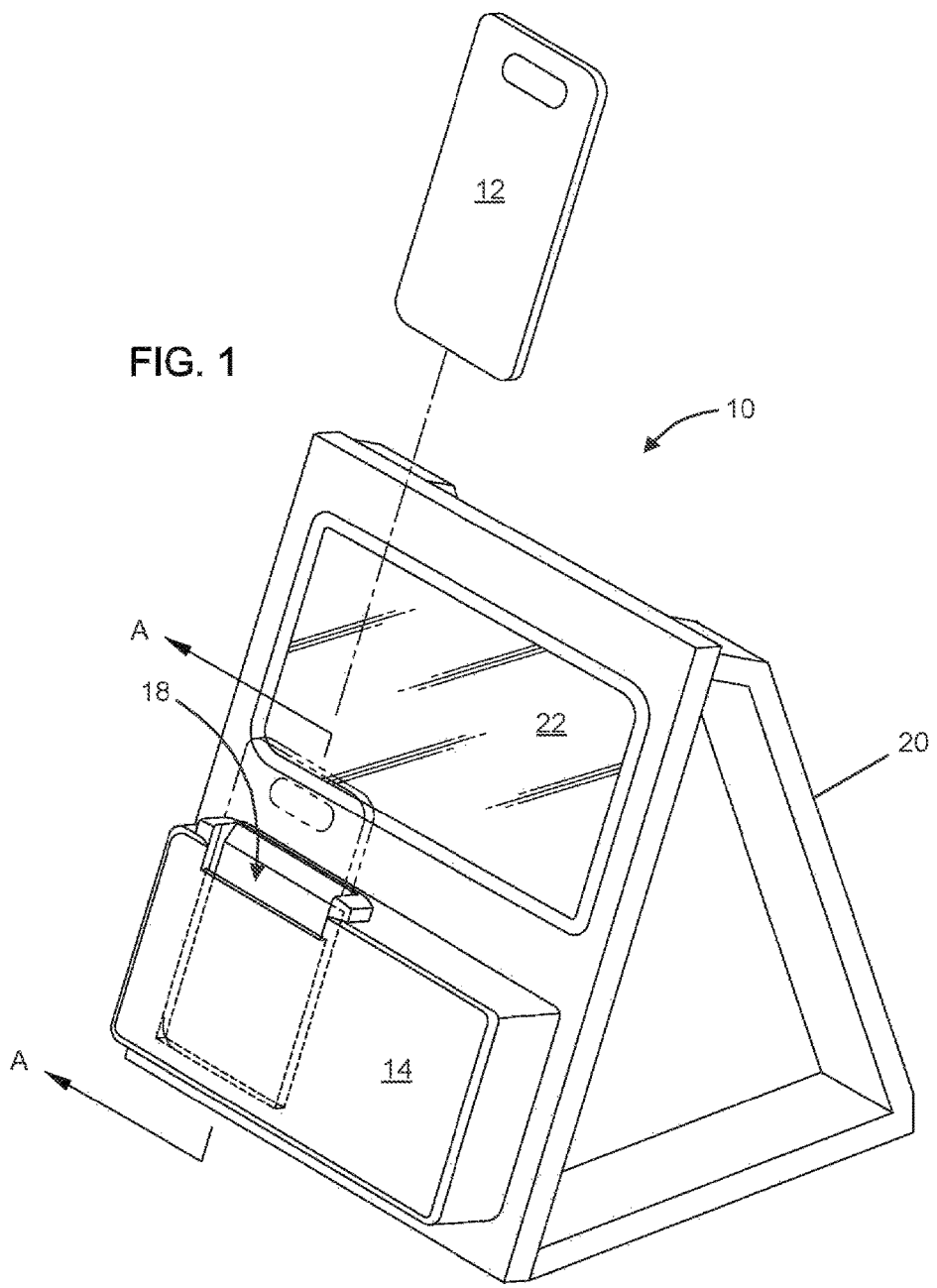
FIG. 1 illustrates an identification assembly for reading an identification device that includes an RFID card, in accordance with some embodiments.

Turning now to the drawings in which like reference numbers refer to like elements in the various drawings, FIG. 1 illustrates an identification assembly 10 for reading an identification device 12 (e.g., an employee badge) that includes an RFID card storing data corresponding to a person to which the identification device 12 is assigned. Identification device 12 may include an RFID card configured to be read at each of two different frequencies. For example, an identification card can include an integrated dual-coil RFID card configured to be read at 125 kHz and at 13.56 MHz such as the security badge described in U.S. Pat. No. 9,652,909, which published on May 16, 2017 and is hereby incorporated herein in its entirety. The identification assembly 10 includes a housing 14 to which an RFID card reader 16 (see FIG. 2) is detachably mounted. The housing 14 includes a slot 18 configured for insertion of the identification device 12 to restrain the identification device 12 in a fixed position and orientation relative to the RFID card reader 16 to maximize the ability of the RFID card reader 16 to accurately read data stored in the RFID card included in the identification device 12. In some embodiments, the housing 14 is integrally molded from a radio frequency permeable material.

In the illustrated embodiment, the identification assembly 10 further includes a frame 20 to which the combination of the housing 14 and the RFID card reader 16 is detachably mounted. The frame 20 is configured to rest on a suitable horizontal surface (e.g., a desktop surface) and support the housing 14 so as to position and orient the slot 18 suitable for convenient insertion of the identification device 12 into the slot 18. In the illustrated embodiment, the frame is configured to orient the slot so that the identification device 12 can be lowered into the slot 18 and released so as to be restrained in the slot 18 via gravity. The frame 20 is further configured to support a display device 22 (e.g., a liquid crystal display) to display information to a user of the identification assembly 10.

Figure 2:
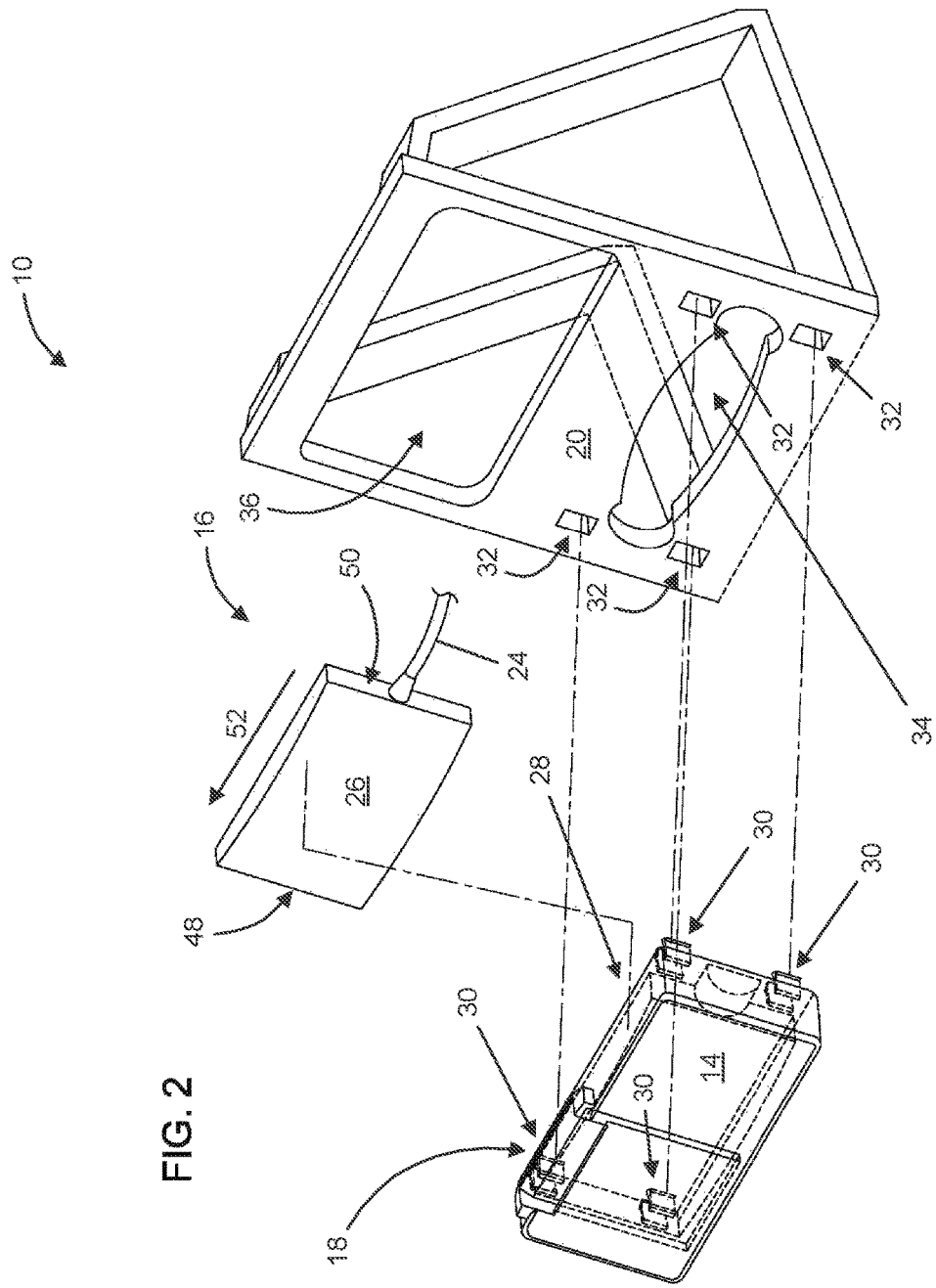
FIG. 2 shows an exploded view of the identification assembly of FIG. 1.

FIG. 2 shows an exploded view of the identification assembly 10. In the illustrated embodiment, the RFID card reader 16 includes a connection cable 24 and a desktop card reader 26 connected to a proximal end of the connection cable 24. The connection cable 24 can be configured to connect the desktop card reader 26 to a computer via a suitable data port (e.g., a Universal Serial Bus (USB) port, an RS-232 serial port, an Ethernet port) of the computer. In some embodiments, the desktop card reader 26 is configured to read an RFID card configured to be read at two different frequencies (e.g., at 125 kHz and at 13.56 MHz). For example, the identification device 12 can include an integrated dual-coil RFID card configured to be read at 125 kHz and at 13.56 MHz and the desktop card reader 26 can be configured to read the integrated dual-coil RFID card at 125 kHz and at 13.56 MHz. Any suitable RFID card reader 16 can be used. For example, a suitable RFID card reader 16 that can be employed is a dual-frequency proximity and contactless card reader (model pcProx® Plus Enroll) made by RFIDEAS (RF IDeas, Inc., 4020 Winnetka Avenue, Rolling Meadows, Ill. 60008).

The housing 14 includes a back recess 28 configured to accommodate the desktop card reader 26 and restrain the desktop card reader 26 in a fixed position and orientation relative to the housing 14. The housing 14 and the frame 20 include complementary connection features configured to be interfaced to detachably mount the combination of the housing 14 and the desktop card reader 26 to the frame 20. In the illustrated embodiment, the housing 14 includes protruding tabs 30 and the frame 20 includes recesses 32 shaped and sized to receive and retain the tabs 30. Each of the tabs 30 has a distal snap fit feature that engages the frame 20 to retain the tab 30 within the respective recess 32. The tabs 30 are configured to deflect transversely when inserted into the respective recess 32 to accommodate insertion of the distal snap fit feature into the recess 32 to a depth in which the distal snap fit feature is positioned to engage the frame 20 to retain the tab 30 within the recess 32. The tabs 30 can be deflected transversely to enable extraction of the tab 30 from the recess 32 to decouple the combination of the housing 14 and the desktop card reader 26 from the frame 20. The frame 20 includes a connection cable aperture 34 through which the desktop card reader 26 can be inserted prior to coupling the desktop card reader 26 with the housing 14 so that the connection cable 24 can extend through the connection cable aperture 34 without having to disconnect the connection cable 24 from the computer to insert the proximal end of the connection cable 24 through the connection cable aperture 34. The frame 20 include a display aperture 36 sized to receive and support the display device 22.

Figure 3:
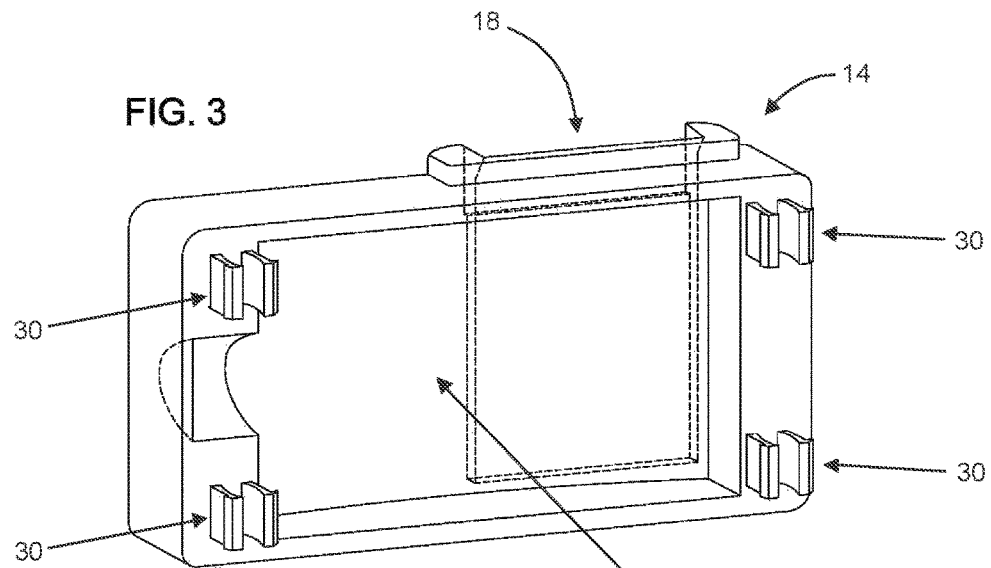
FIG. 3 illustrates a housing of the identification assembly of FIG. 1.

FIG. 3 shows a back view of the housing 14. The back recess 28 is disposed on the back of the housing 14 and configured to accommodate the desktop card reader 26 in a fixed position and orientation relative to the housing 14 when the housing 14 is mounted to the frame 20. The slot 18 is configured for insertion of the identification device 12 into the slot 18 to restrain the identification device 12 relative to the housing 14. As a result, the identification device 12, when inserted into the slot 18, is restrained in a fixed position and orientation relative to the desktop card reader 26.

Figure 4:
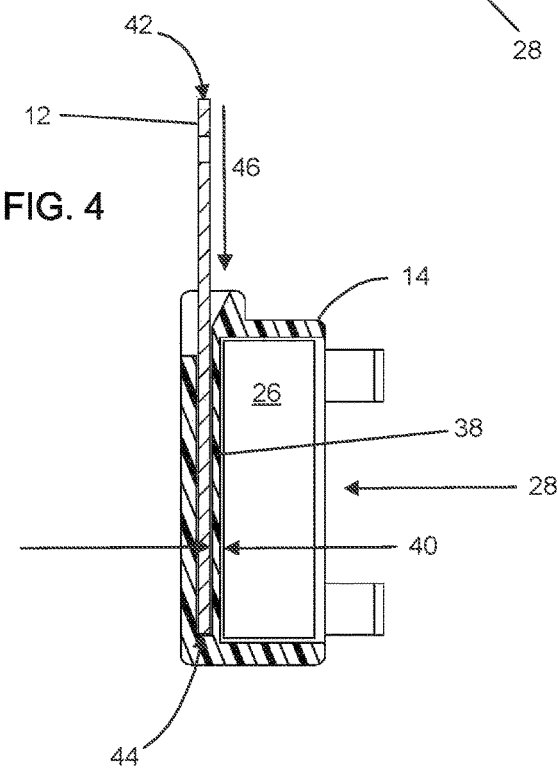
FIG. 4 is a cross-sectional view through the identification assembly of FIG. 1.

FIG. 4 shows cross-sectional view AA (defined in FIG. 1) through the identification device 12, the housing 14, and the desktop card reader 26 with the identification device 12 disposed within the slot 18. At least when the combination of the housing 14 and the desktop card reader 26 are mounted to the frame 20, the desktop card reader 26 is constrained in a fixed position and orientation relative to the slot 18 of the housing 14. For example, the housing 14 is configured such that the desktop card reader 26 fits into the housing 14 such that the desktop card reader is elongate along a first line. In this example, the housing 14 is further configured such that the identification device 12 fits into the housing 14 such that the identification device 12 is elongate along a second line, wherein the first and second lines each lie in planes that are perpendicular to each other. In some embodiments, the housing 14 is configured to retain the desktop card reader 26 in the back recess 28 in the fixed position and orientation relative to the slot 18 even when the housing 14 is not mounted to the frame 20. In the illustrated embodiment, the housing 14 has an intervening web 38 that is disposed between and separates the desktop card reader 26 from the slot 18. In some embodiments, the housing 14 is integrally molded from a radio frequency permeable material.

In some embodiments, the housing 14 is configured so that the fixed position and orientation in which the slot 18 restrains the identification device 12 relative to the desktop card reader 26 has been determined to maximize the ability of the desktop card reader 26 to accurately scan the identification device 12. In the illustrated embodiment, the identification device 12 is separated from the desktop card reader 26 by a separation distance 40 that has been determined to maximize the scanning accuracy of the desktop card reader 26 in reading the identification device 12. The inventor surmises that in some dual-coil RFID cards, the two coils together create interference with each other that reduces the standard reading field of some desktop card readers. Intuitively, the best reading position would be to dispose the identification device 12 directly proximate the desktop card reader 26. Counterintuitively, and because of the interference between the two coils, the optimal reading field is in fact spaced apart from the desktop card reader 26. By creating a non-zero separation distance between the desktop card reader 26 and the identification device 12, and by also optionally being configured such that the desktop card reader 26 and the identification device 12 are elongate along lines that are perpendicular to each other (as described in detail above), the housing 14 optimally positions the identification device 12 for reading. For example, in the illustrated embodiment the separation distance 40 is 2.4 mm, which has been found to position the identification card in an optimal read area. In some embodiments, the separation distance 40 may be within a range from 1.6 mm to 3.5 mm. In some embodiments, the separation distance 40 is any suitable distance within a range from 2.0 mm to 3.0 mm. In some embodiments, the orientation of the slot 18 relative to the orientation of the desktop card reader 26 is selected so as to maximize the scanning accuracy of the desktop card reader 26 in reading the identification device 12. For example, in the illustrated embodiment: (a) the identification device 12 has a top end 42, a bottom end 44, and an insertion direction 46 extending from the top end 42 to the bottom end 44; (b) the desktop card reader 26 has a distal end 48, a proximal end 50 from which the connection cable 24 extends, and a length direction 52 extending from the proximal end 50 to the distal end 48 (shown in FIG. 2); and (c) the slot 18 is oriented so that the insertion direction 46 is oriented perpendicular to the length direction 52. In some embodiments, the location of the slot 18 relative to the desktop card reader 26 and perpendicular to the insertion direction 46 is selected so as to maximize the scanning accuracy of the desktop card reader 26 in reading the identification device 12. For example, in the illustrated embodiment, the location of the slot 18 perpendicular to the insertion direction 46 is offset towards the distal end 48 of the desktop card reader 26 so that a side of the identification device 12 is aligned with the distal end 48 of the desktop card reader 26 when the identification device 12 is restrained via the slot 18.

Figure 5:
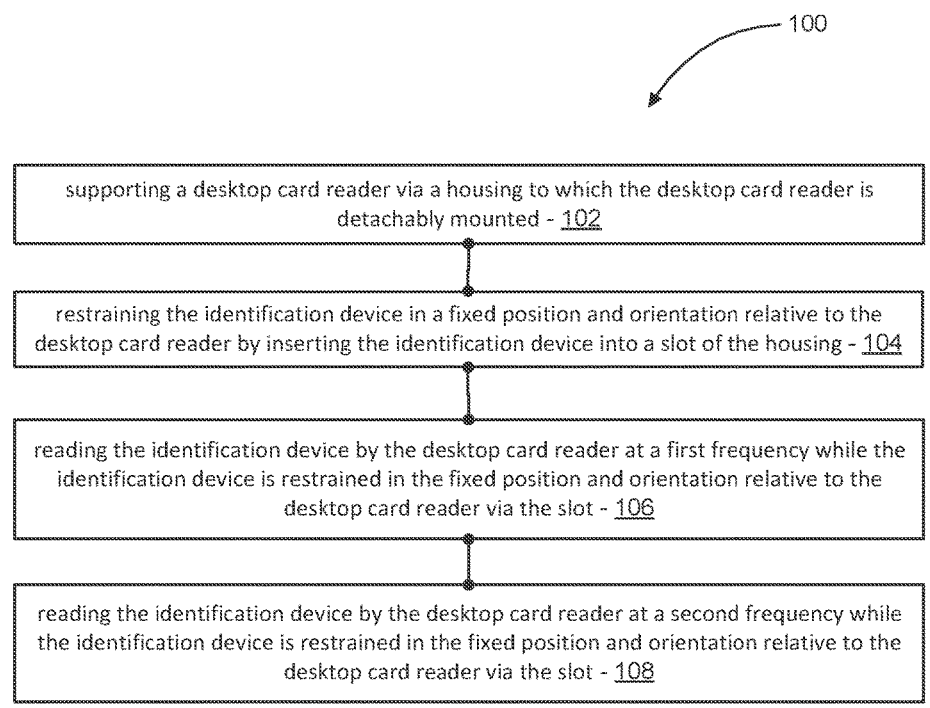
FIG. 5 is a simplified block diagram of acts of a method for reading an identification device with a desktop card reader, in accordance with some embodiments.

FIG. 5 is a simplified block diagram of acts of a method 100 for reading an identification device with a desktop card reader, in accordance with some embodiments. The identification device can include an integrated dual-coil Radio Frequency Identification (RFID) card configured to be read at a first frequency (e.g., 125 kHz) and a second frequency (e.g., 13.56 MHz) different from the first frequency. Any suitable identification system and/or identification assembly, such as those described herein, can be used to practice the method 100. Some or all of the method 100 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The method 100 includes supporting the desktop card reader via a housing to which the desktop card reader is detachably mounted (act 102). The identification device is restrained in a fixed position and orientation relative to the desktop card reader by inserting the identification device into a slot of the housing (act 104). The identification device is read by the desktop card reader at a first frequency while the identification device is restrained in the fixed position and orientation relative to the desktop card reader via the slot (act 106). The identification device is read by the desktop card reader at a second frequency while the identification device is restrained in the fixed position and orientation relative to the desktop card reader via the slot (act 108).

Figure 6:
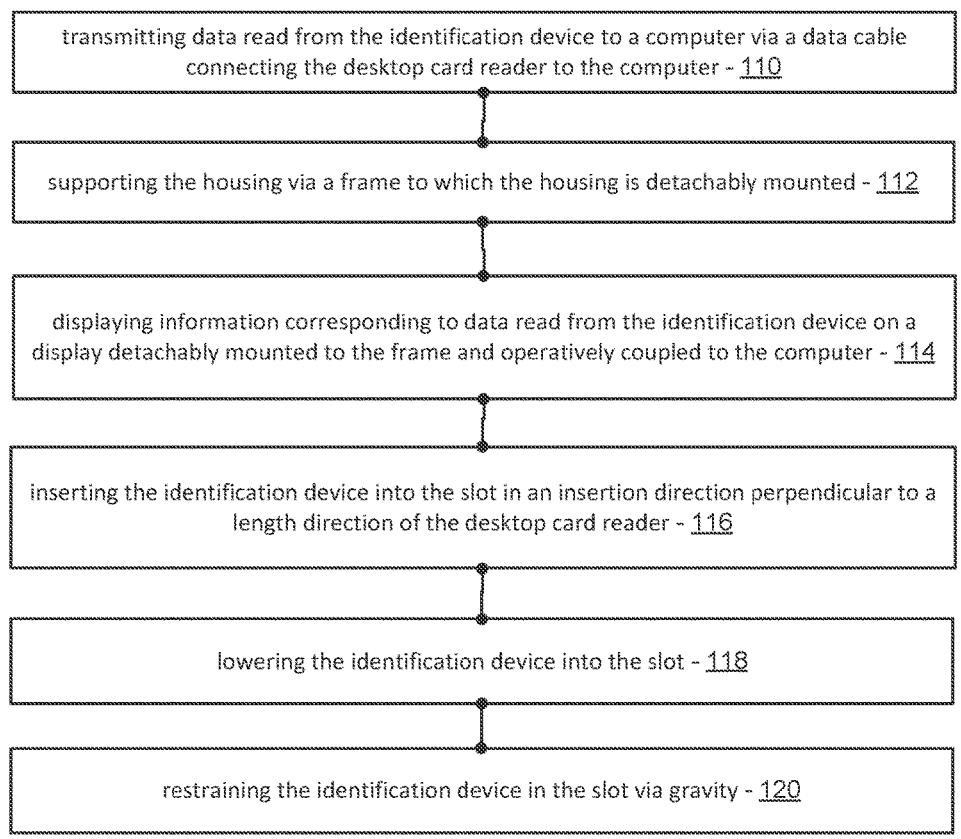
FIG. 6 is a simplified block diagram of additional acts that can be accomplished in the method of FIG. 6.

FIG. 6 is a simplified block diagram of additional acts that can be practiced in the method 100. The method 100 can further include transmitting data read from the identification device to a computer via a data cable connecting the desktop card reader to the computer (act 110). The housing can be supported via a frame to which the housing is detachably mounted (act 112). Information corresponding to data read from the identification device can be displayed on a display device detachably mounted to the frame and operatively coupled to the computer (act 114). The identification device can be inserted into the slot in an insertion direction perpendicular to a length direction of the desktop card reader (act 116). The identification device can be lowered into the slot (act 118). The identification device can be restrained in the slot via gravity (act 120).

Figure 7:
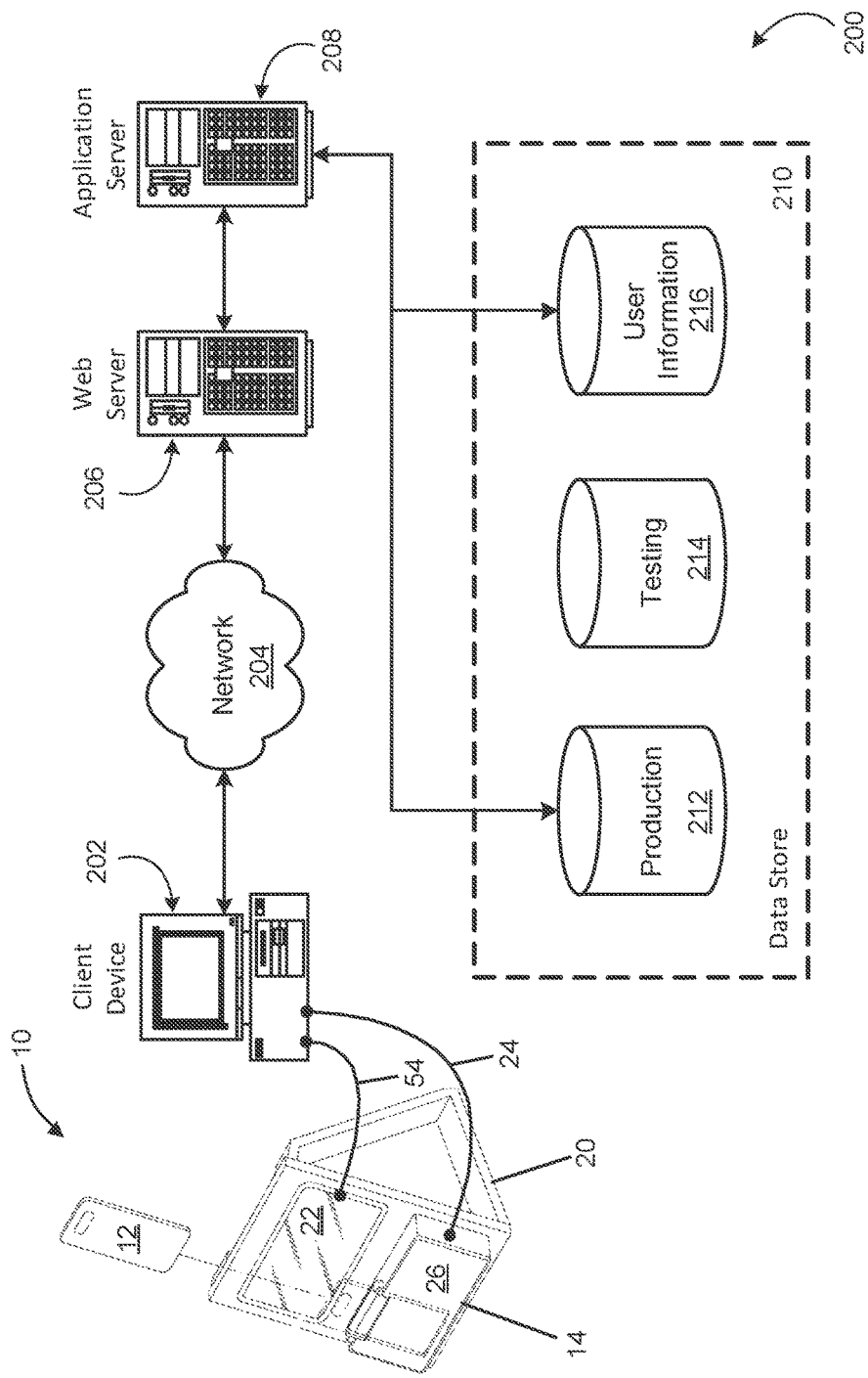
FIG. 7 illustrates an environment in which various embodiments can be implemented.

FIG. 7 illustrates aspects of an example environment 200 for implementing aspects in accordance with various embodiments. As will be appreciated, although a Web-based environment is used for purposes of explanation, different environments may be used, as appropriate, to implement various embodiments. The environment includes an electronic client device 202, which can include any appropriate device operable to send and receive requests, messages, or information over an appropriate network 204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 206 for receiving requests and serving content in response thereto, although for other networks an alternative device serving a similar purpose could be used as would be apparent to one of ordinary skill in the art.

In the example environment 200, the desktop card reader 206 is operatively coupled with a suitable data port of the electronic client device 202 (e.g., a Universal Serial Bus (USB) port, an RS-232 serial port, an Ethernet port) via the connection cable 24. The display device 22 is operatively coupled with a suitable display port of the electronic client device 202 via a display connection cable 54. In operation, data read from the identification device 12 by the desktop card reader 26 is transmitted by the desktop card reader 26 to the electronic client device 202 via the connection cable 24. Information corresponding to data read from the identification device 12 can be displayed on the display device 22 by the electronic client device 12.

The illustrative environment includes at least one application server 208 and a data store 210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 202 and the application server 208, can be handled by the Web server. It should be understood that the Web and application servers are not required and are merely example components, as structured code discussed herein can be executed on any appropriate device or host machine as discussed elsewhere herein.

The data store 210 can include several separate data tables, databases or other data storage mechanisms and media for storing data relating to a particular aspect. For example, the data store illustrated includes mechanisms for storing production data 212 and user information 216, which can be used to serve content for the production side. The data store also is shown to include a mechanism for storing log data 214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 210. The data store 210 is operable, through logic associated therewith, to receive instructions from the application server 208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 200 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An identification system for reading an identification badge that includes an integrated dual-coil Radio Frequency Identification (RFID) card configured to be read at 125 kHz and at 13.56 MHz, the identification system comprising:
   a computer including a Universal Serial Bus (USB) port, an RS-232 serial port, and/or an Ethernet port;
   a card reader assembly including a connection cable and a desktop card reader connected to a proximal end of the connection cable, the desktop card reader being configured to read the integrated dual-coil RFID card at 125 kHz and at 13.56 MHz, the connection cable being configured to connect the desktop card reader to the computer via one of the USB port, the RS-232 serial port, or the Ethernet port;
   a housing having a back recess into which the desktop card reader is removably fitted, the housing including a slot into which the identification badge is inserted to restrain the identification badge in a fixed position and orientation relative to the desktop card reader in which the identification badge is spaced apart from the desktop card reader by a gap in a range from 1.6 mm to 3.5 mm; and
   a frame to which the housing with the desktop card reader fitted into the back recess is detachably mounted, the desktop card reader being restrained in a fixed position and orientation relative to the housing via the housing and the frame.

2. The identification system of claim 1, wherein the gap is in a range from 2.0 mm to 3.0 mm.

3. The identification system of claim 2, wherein:
   the identification badge has a top end, a bottom end, and an insertion direction extending from the top end to the bottom end;
   the desktop card reader has a distal end, a proximal end from which the connection cable extends, and a length direction extending from the proximal end to the distal end; and
   the insertion direction is oriented transverse to the length direction when the identification badge is restrained via the slot.

4. The identification system of claim 3, wherein the insertion direction is oriented perpendicular to the length direction when the identification badge is restrained via the slot.

5. The identification system of claim 1, wherein:
   the frame is configured to rest on a horizontal surface so as to orient the slot so that the identification badge can be lowered into the slot and restrained in the slot via gravity; and
   the frame has a connection cable aperture through which the desktop card reader can be passed so that the connection cable extends through the connection cable aperture from the desktop reader fitted into the back recess.

6. The identification system of claim 5, further comprising a display assembly including:
   a display detachably mounted into a display aperture of the frame; and
   a display connection cable operatively connecting the display to the computer,
   wherein the computer is configured to display information on the display corresponding to data obtained from the integrated dual-coil RFID card by the desktop card reader.

7. The identification system of claim 1, wherein the housing and the frame have complementary connection features that interface to detachably mount the housing with the desktop reader fitted into the back recess to the frame.

8. A fixture for restraining an identification device that includes a Radio Frequency Identification (RFID) tag relative to a desktop card reader configured to read the RFID tag and communicate data read from the RFID tag to a computer; the identification device having a top end, a bottom end, and an insertion direction extending from the top end to the bottom end; the desktop card reader having a distal end, a proximal end from which a connection cable of the desktop card reader extends, and a length direction extending from the proximal end to the distal end; the fixture comprising:

a housing having a back recess into which the desktop card reader is removably fitted, the housing having a slot into which the identification device is inserted to restrain the identification device in a fixed position and orientation relative to the desktop card reader in which the identification device is spaced apart from the desktop card reader by a gap, the insertion direction being oriented perpendicular to the length direction when the identification device is restrained via the slot; and a frame to which the housing with the desktop card reader fitted into the back recess is detachably mounted, the desktop card reader being restrained in a fixed position and orientation relative to the housing via the housing and the frame.

9. The fixture of claim 8, wherein the gap is in a range from 1.6 mm to 3.5 mm.

10. The fixture of claim 8, wherein the slot is configured so that a side of the identification device is aligned with the distal end of the desktop card reader when the identification device is restrained via the slot.

11. The fixture of claim 8, wherein:
the frame is configured to rest on a horizontal surface so as to orient the slot so that the identification device can be lowered into the slot and restrained in the slot via gravity; and
the frame has a connection cable aperture through which the desktop card reader can be passed so that the connection cable extends through the connection cable aperture from the desktop reader fitted into the back recess.

12. The fixture of claim 11, further comprising a display detachably mounted into a display aperture of the frame and configured to be operatively coupled to the computer.

13. The fixture of claim 8, wherein the housing and the frame have complementary connection features that interface to detachably mount the housing with the desktop reader fitted into the back recess to the frame.

14. A method for reading an identification device with a desktop card reader assembly, the identification device including an integrated dual-coil Radio Frequency Identification (RFID) card configured to be read at a first frequency and a second frequency different from the first frequency, the method comprising:
fitting the desktop card reader into a back recess of a housing;
detachably mounting the housing with the desktop reader fitted into the back recess to a frame so that the desktop card reader is restrained in a fixed position and orientation relative to the housing via the housing and the frame;
restraining the identification device in a predetermined fixed position and orientation relative to the desktop card reader in which the identification device is spaced apart from the desktop card reader by a gap of at least 1.6 mm by inserting the identification device into a slot of the housing with the desktop reader fitted into the back recess;
reading the integrated dual-coil RFID card by the desktop card reader at the first frequency while the identification device is restrained via the slot; and
reading the integrated dual-coil RFID card by the desktop card reader at the second frequency while the identification device is restrained via the slot.

15. The method of claim 14, further comprising transmitting data read from the integrated dual-coil RFID card to a computer via a data cable connecting the desktop card reader to the computer.

16. The method of claim 15, further comprising:
displaying information corresponding to data read from the integrated dual-coil RFID card on a display detachably mounted into a display aperture of the frame and operatively coupled to the computer.

17. The method of claim 14, wherein the gap is in a range from 2.0 mm to 3.0 mm.

18. The method of claim 14, wherein the desktop card reader has a distal end, a proximal end from which a connection cable of the card reader extends, and a length direction extending from the proximal end to the distal end, the method further comprising inserting the identification device into the slot in an insertion direction perpendicular to the length direction of the desktop card reader.

19. The method of claim 14, further comprising:
lowering the identification device into the slot; and
restraining the identification device in the slot via gravity.

20. The method of claim 14, further comprising:
prior to the fitting of the desktop reader into the back recess of the housing, passing the desktop reader through a connection cable aperture of the frame so that the connection cable extends through the connection cable aperture from the desktop reader fitted into the back recess.

* * * * *